(12) United States Patent
Mamour et al.

(10) Patent No.: US 8,908,901 B2
(45) Date of Patent: Dec. 9, 2014

(54) APPARATUS AND METHOD FOR SURFACE MEASUREMENT (75) Inventors: Khaled Mamour, Bristol (GB); Jean-Louis Grzesiak, Bristol (GB)

(73) Assignee: Renishaw PLC, Wotton-under-Edge (GB)

( * ) Notice: Subject to any disclaimer, the term of this patent is extended or adjusted under 35 U.S.C. 154(b) by 663 days.

(21) Appl. No.: 12/450,991

(22) PCT Filed: Apr. 23, 2008

(86) PCT No.: PCT/GB2008/001439
§ 371 (c)(1),
(2), (4) Date: Oct. 21, 2009

(87) PCT Pub. No.: WO2008/129305
PCT Pub. Date: Oct. 30, 2008

(65) Prior Publication Data
US 2010/0119104 A1 May 13, 2010

(30) Foreign Application Priority Data
Apr. 24, 2007 (GB) .................................. 0707921.3

(51) Int. Cl.
*G06K 9/00* (2006.01)
*G01B 5/00* (2006.01)
*G01B 5/012* (2006.01)
*G01B 21/04* (2006.01)

(52) U.S. Cl.
CPC .............. *G01B 5/0032* (2013.01); *G01B 5/012* (2013.01); *G01B 21/045* (2013.01)
USPC ........................................................ 382/100

(58) Field of Classification Search
None
See application file for complete search history.

(56) References Cited

U.S. PATENT DOCUMENTS

| | | | |
|---|---|---|---|
| 4,084,323 A | 4/1978 | McMurtry | |
| 4,518,898 A * | 5/1985 | Tarnowski et al. | ............ 315/371 |
| 5,088,046 A | 2/1992 | McMurtry | |
| 5,189,806 A | 3/1993 | McMurtry et al. | |
| 5,311,784 A | 5/1994 | Girard et al. | |
| 5,319,442 A * | 6/1994 | Rosser | ........................ 356/615 |
| 5,521,847 A | 5/1996 | Ostrowski et al. | |

(Continued)

FOREIGN PATENT DOCUMENTS

CN 101166950 A 4/2008
DE 10 2005 015 826 A1 10/2006

(Continued)

OTHER PUBLICATIONS

International Search Report mailed Apr. 16, 2010 issued in International Patent Application No. PCT/GB2009/002576.

(Continued)

*Primary Examiner* — Tahmina Ansari
(74) *Attorney, Agent, or Firm* — Oliff PLC (57) ABSTRACT

A method of determining the dimensions and location of a surface feature, for example a valve seat. The surface of the feature is measured, for example using a spiral scan path with a tactile probe and the multiple data points acquired from the scan are used to create a digitized image. The digitized image is fitted to a nominal image (e.g. CAD data) of the surface feature. The deviation of the digitized image from the nominal image is used to determine at least one of the dimensions, location and form deviation of the surface feature.

21 Claims, 7 Drawing Sheets

(56) References Cited

U.S. PATENT DOCUMENTS

| | | | |
|---|---|---|---|
| 5,681,981 | A | 10/1997 | McMurtry |
| 5,825,666 | A * | 10/1998 | Freifeld ........................ 702/153 |
| 6,064,759 | A * | 5/2000 | Buckley et al. ................ 382/154 |
| 6,154,713 | A * | 11/2000 | Peter et al. ........................ 702/95 |
| 6,674,891 | B1 | 1/2004 | Sameshima |
| 7,126,700 | B2 | 10/2006 | Bao et al. |
| 7,228,254 | B2 | 6/2007 | Numata et al. |
| 7,809,523 | B2 | 10/2010 | Hunter et al. |
| 8,175,842 | B2 | 5/2012 | Cameron et al. |
| 2003/0019119 | A1 | 1/2003 | Sato et al. |
| 2003/0167103 | A1 | 9/2003 | Tang et al. |
| 2004/0055170 | A1 * | 3/2004 | Grzesiak et al. ................ 33/502 |
| 2004/0071334 | A1 | 4/2004 | Hassler et al. |
| 2005/0114059 | A1 | 5/2005 | Chang et al. |
| 2006/0266100 | A1 | 11/2006 | McMurtry et al. |
| 2007/0080967 | A1 * | 4/2007 | Miller ........................... 345/473 |
| 2007/0132990 | A1 * | 6/2007 | Fukami et al. ............. 356/241.1 |
| 2007/0236234 | A1 | 10/2007 | Huebner |
| 2008/0205786 | A1 * | 8/2008 | Young et al. ................... 382/261 |
| 2009/0123032 | A1 * | 5/2009 | Kanisawa et al. ............. 382/106 |
| 2009/0307916 | A1 * | 12/2009 | McLean et al. ................. 33/503 |
| 2010/0119104 | A1 * | 5/2010 | Mamour et al. ............. 382/100 |
| 2010/0268355 | A1 | 10/2010 | Chang et al. |

FOREIGN PATENT DOCUMENTS

| | | |
|---|---|---|
| EP | 0 166 270 A2 | 1/1986 |
| EP | 1 003 009 A1 | 5/2000 |
| EP | 1 256 779 A2 | 11/2002 |
| EP | 1 273 876 A2 | 1/2003 |
| EP | 1 760 422 A1 | 3/2007 |
| GB | 1 551 218 | 8/1979 |
| GB | 2 409 739 A | 7/2005 |
| GB | 2 240 414 A | 5/2006 |
| GB | 2 432 553 A | 5/2007 |
| JP | A-51-149050 | 12/1976 |
| JP | A-02-502581 | 8/1990 |
| JP | A-03-504278 | 9/1991 |
| JP | A-05-010751 | 1/1993 |
| JP | A-06-129846 | 5/1994 |
| JP | A-08-166259 | 6/1996 |
| JP | A-08-508579 | 9/1996 |
| JP | A-11-081935 | 3/1999 |
| JP | A 11-237344 | 8/1999 |
| JP | A-2002-541469 | 12/2002 |
| JP | A-2005-172830 | 6/2005 |
| WO | WO 90/07097 A1 | 6/1990 |
| WO | WO 91/20054 A1 | 12/1991 |
| WO | WO 92/09865 | 6/1992 |
| WO | WO 95/20747 A1 | 8/1995 |
| WO | WO 00/62015 A1 | 10/2000 |
| WO | WO 2005/050133 A1 | 6/2005 |
| WO | WO 2005/090900 A1 | 9/2005 |
| WO | WO 2006/024844 A2 | 3/2006 |
| WO | WO 2006/114567 A1 | 11/2006 |
| WO | WO 2006/115923 A2 | 11/2006 |
| WO | WO 2007/107776 A1 | 9/2007 |

OTHER PUBLICATIONS

Forbes, "Least-Squares Best-Fit Geometric Elements," National Physical Laboratory Report DITC 140/89, Apr. 1989, pp. 1-30.
Forbes, "Robust Circle and Sphere Fitting by Least Squares," National Physical Laboratory Report DITC 153/89, Nov. 1989, pp. 1-22.
Baldwin, "Bibliography of Papers, Reports, and Presentations Related to Point-Sample Dimensional Measurement Methods for Machined Part Evaluation," Sandia Report, SAND96-8237•UC-406, Apr. 1996, pp. 1-84.
British Search Report in British Patent Application No. GB0819828.5, dated Dec. 11, 2008.
British Search Report in British Patent Application No. GB0819826.9, dated Jan. 16, 2009.
Written Opinion of the International Search Authority in International Application No. PCT/GB2009/002576, dated Apr. 16, 2010.
U.S. Appl. No. 13/122,499 in the name of Jean-Louis Grezesika, filed on Apr. 4, 2011.
Chinese Office Action dated Aug. 31, 2012 from Chinese Patent Application No. 200980143127.6 (with English-language translation).
U.S. Office Action dated Feb. 1, 2013 from U.S. Appl. No. 13/122,499.
Jun. 18, 2013 Office Action issued in Chinese Patent Application No. 200980143127.6 w/translation.
Mar. 29, 2013 Office Action issued in Japanese Patent Application No. 2010-504831 (with translation).
Jul. 2, 2013 Office Action issued in Japanese Patent Application No. 2011-533816 (with translation).
Oct. 25, 2013 Office Action issued in U.S. Appl. No. 13/122,499.
Feb. 8, 2014 Office Action issued in Chinese Patent Application No. 200980143127.6 (with translation).
Aug. 1, 2014 Office Action issued in U.S. Appl. No. 13/122,499.
Jul. 14, 2010 Office Action issued in Chinese Patent Application No. 200880013684.1 (with translation).
Mar. 23, 2011 Office Action issued in Chinese Patent Application No. 200880013684.1 (with translation).
Feb. 28, 2012 Office Action issued in Chinese Patent Application No. 200880013684.1 (with translation).
Aug. 3, 2012 Office Action issued in Chinese Patent Application No. 200880013684.1 (with translation).

* cited by examiner

APPARATUS AND METHOD FOR SURFACE MEASUREMENT

The present invention relates to an apparatus and method for measuring a surface feature, in particular by forming a digitized image of the surface. The invention also relates to a method of adaptive scanning using an articulating probe head capable of orienting a surface sensing device about two or more axes mounted on a coordinate positioning machine, such as a coordinate measuring machine (CMM), machine tool, articulating, arm, etc.

It is common practice, after workpieces have been produced, to inspect them on a co-ordinate measuring machine (CMM) having a quill which can be driven in three orthogonal directions, X, Y, Z, within a working volume of the machine. The quill may carry a measurement probe which produces a signal when it detects a surface of the workpiece being inspected, for example by contact between a stylus of the measurement probe and the surface.

Commonly, the CMM includes a computer programmed to take a series of readings of co-ordinate data at various locations on the workpiece, in order to perform a complete inspection of desired dimensions of the workpiece. A determination can then be made as to whether the workpiece is of acceptable quality, or whether it should be rejected.

An analogue (or scanning) contact probe typically comprises a housing with a deflectable stylus. The stylus has a surface contacting tip and deflection from its rest position is measured by transducers. The combination of stylus deflection with CMM position is used to determine the location of the stylus tip (and hence the coordinates of the point on the surface in which it is in contact). Such an analogue probe is described GB 1551218.

It is known to mount a measurement probe on an articulating probe head which enables the orientation of the measurement probe to be varied, typically about two or more axes. Such an articulating probe head is described in European patent EP 0402440. The articulating probe enables rotation about first and second orthogonal axes. Motors and transducers are provided in the articulating probe head to enable the measurement probe to be continuously positioned about rotation axes of the articulating probe head with the position being feedback to a computer.

A feature which has proved difficult to measure using conventional techniques is a valve seat. Valve seats are of particular importance to the automotive industry due to their use in the internal combustion engine. A badly fitting valve affects the efficiency of the engine, due to a poor seal between the valve disk and valve seat or by the location of the valve seat preventing the valve from opening fully. There are four main factors in the machining of the valve seat which causes poor fitting. The height of the valve seat in the valve body, which can prevent the valve from opening or closing properly; the shape of the valve seat, which if not uniformly round can prevent a good fit and therefore cause leakage; error in the lateral position of the valve seat in the valve body, effecting the fit; and an error in the angle of the valve seat in the valve body, which can cause line contact only between the valve disk and valve seat.

Valve seats are difficult and time consuming to measure by conventional techniques. Typically, a valve is conventionally measured by taking measurements along four lines from the top to the bottom of the valve seat, each line spaced 90 degrees about the circumference of the valve seat; these measurements enable the profile of the valve seat to be determined. The circumference of the valve seat is measured by following circular measurement paths at specific heights to determine the form and co-centricity with the guide. These measurements are typically taken with an analogue contact probe mounted on the quill of CMM and have the disadvantage that measurement is slow. The measurements are used to determine if the diameter of the valve seat is within tolerance. However, data is only available for the four measurement lines (i.e. and not between them. Also, due to the measurement point distribution, it is difficult to determine circularity of the valve seat.

A first aspect of the present invention provides a method of determining the dimensions and location of a surface feature, the method comprising the steps of:
   (a) creating a digitized image of a surface feature from multiple data points acquired from surface measurement of the feature;
   (b) fitting the digitized image to a nominal image of the surface feature; and
   (c) determining the deviation of the digitized image from the nominal image to thereby determine at least one of the dimensions, location and form deviation of the surface feature.

The multiple data points acquired from surface measurement of the feature may be collected by using a surface sensing device mounted on a coordinate positioning apparatus. The surface sensing device may comprise a measurement probe with is preferable mounted on an articulating probe head which enables rotation of the measurement probe about two or more axes. The surface sensing device is preferably a contact probe. The coordinate position apparatus may comprise a coordinate measuring machine (CMM), machine tool, non Cartesian machine, articulating arm, robotic arm or manual CMM.

The step of creating a digitized image is preferably carried out in software (i.e. by a computer programme). Preferably the computer programme is provided on a carrier, such as a CD, USB stick or other medium, which when loaded onto a computer carries out the invention. The computer program may also be downloaded directly from the internet.

The step of fitting the digitized image to a nominal image in step (b) is preferably carried out by a best fit method, for example least squares. Preferably the multiple data points relate to a surface area greater than the surface area of the surface feature. A different section of the digitized image may be fitted to a nominal image in turn. Each section may be at a different position along a centre line of the surface feature The nominal image may comprise a CAD image of the surface feature.

The deviation of the digitized image from the nominal image determined in step (c) may be used to determine lateral position of the surface feature within a part, height of the surface feature within a part and angle of the surface feature within a part. This deviation may be used to determine the coordinates of the surface features or to determine whether the surface feature is within tolerance with respect to the nominal data.

Preferably the multiple data points are acquired from tactile surface measurement of the feature.

Preferably the surface measurements are collected from a spiral measurement profile.

A second aspect of the invention provides a computer programme for determining the dimensions and location of a surface feature, the computer programme comprising code adapted to perform the steps outlined above when executed on a computer.

A third aspect of the invention provides a method for scanning a surface feature, the surface feature having a centre line and a non uniform radius, using a surface sensing device mounted on an articulating head which enables rotation about two or more axes, the articulating probe head being mounted on a coordinate positioning apparatus, the method comprising the steps of:

programming the coordinate positioning apparatus to move the articulating probe head along the centre line of the surface profile;

programming the articulating probe head to move the surface sensing device in a circle of constant radius;

determining whether the measurement probe is within its measurement range whilst the measurements are being taken; and adapting the motion of the articulating head so that the surface sensing device is positioned at an angle to maintain it within its measurement range.

Preferable the surface sensing device is a measurement probe. It may comprise a contact measurement probe and more preferably an analogue probe.

Preferably the measurement is tactile measurement.

A fourth aspect of the present invention provides apparatus for scanning a surface feature, the surface feature having a centre line and a non uniform radius, using a surface sensing device mounted on an articulating head which enables rotation about two or more axes, the articulating probe head being mounted on a coordinate positioning apparatus, and a computer, the computer capable of carrying out the steps of:

programming the coordinate positioning apparatus to move the articulating probe head along the centre line of the surface profile;

programming the articulating probe head to move the surface sensing device in a circle of constant radius;

determining whether the measurement probe is within its measurement range whilst the measurements are being taken; and adapting the motion of the articulating head so that the surface sensing device is positioned at an angle to maintain it within its measurement range.

A fifth aspect of the present invention provides a method of determining the dimensions and location of a valve seat, the method comprising the steps of:

(a) measuring the surface of the valve seat along a spiral path;

(b) creating a digitized image of the surface of the valve seat from multiple data points acquired from surface measurement of the valve seat;

(b) fitting the digitized image to a nominal image of surface of the valve seat.

Preferably the measurement in step (a) is tactile measurement.

In a preferred embodiment, the method includes an additional step of determining the deviation of the digitized image from the nominal image. The deviation may be used to determine at least one of the dimensions, location and form deviation of the surface feature.

Examples of preferred embodiments of the present invention will now be described with reference to the accompanying drawings wherein.

Figure 1:
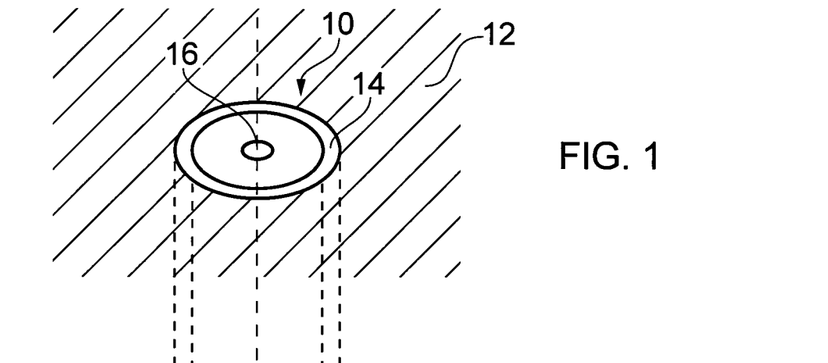
FIG. 1 is a perspective view of a valve seat in a valve body.
Figure 2:
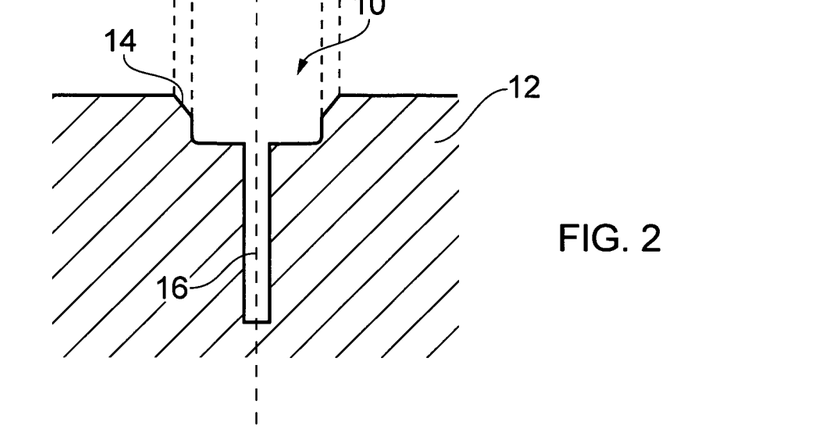
FIG. 2 is a side cross sectional view of the valve seat of FIG. 1.
Figure 3:
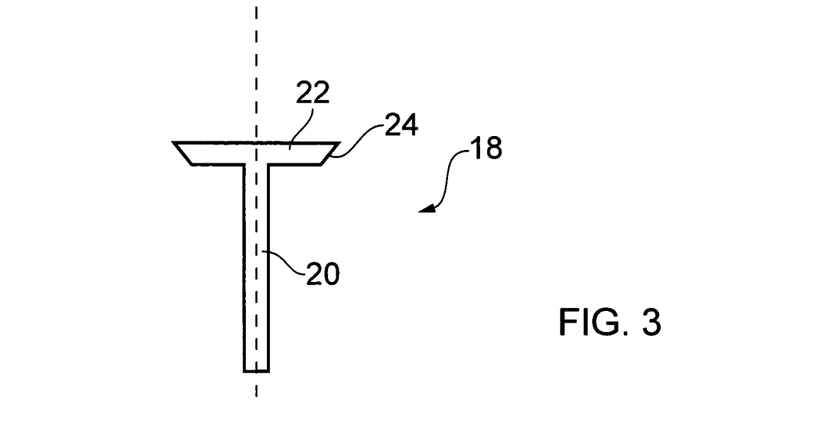
FIG. 3 is a side view of a valve disc.

FIGS. 1 and 2 illustrate perspective and cross sectional views of a valve seat respectively. FIG. 3 illustrates a side view of a valve disk for insertion into the valve seat. These valves are of the type found in cylinder heads of automotive engines, for example.

The valve seat 10 is located in a valve body 12. The valve seat comprises a conical surface 14 defining a recess in the valve body, leading to a cylindrical aperture 16. The valve disk 18 comprises a cylindrical stem 20 sized to fit snugly within the cylindrical aperture of the valve seat. A disk member 22 is provided at one end of the stem 20, the disk member 22 having a conical surface 24 on its circumferential surface. The valve seat and disk member of the valve disk have corresponding conical surfaces 14, 24 which form a seal when the valve disk is inserted into the valve seat.

A good fit between the conical surfaces of the valve seat and valve disk are required for good operation of the valve. However, if the conical surface of the valve seat is incorrectly shaped or positioned, the quality of the seal is compromised. For example, the conical surface of the valve seat may be the incorrect size or may not be accurately circular. The conical surface may have been machined in the wrong lateral position or the wrong height or may have been machined at the wrong angle.

Figure 4:
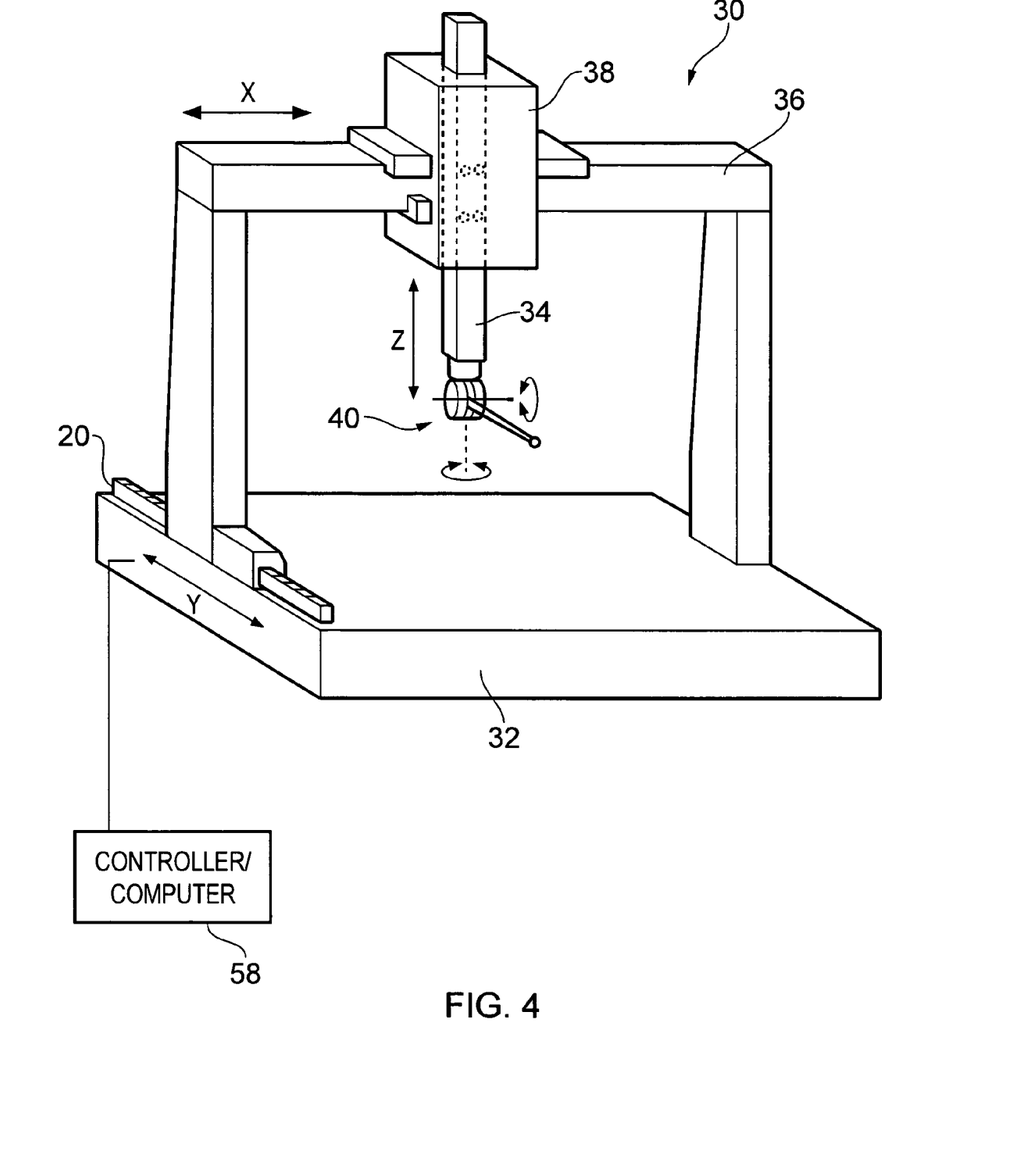
FIG. 4 is a perspective view of an articulating probe head mounted on a coordinate measuring machine.

FIG. 4 illustrates the apparatus used to measure the valve seat according to the present invention. The workpiece containing the valve seat is mounted on a coordinate positioning apparatus, such as a coordinate measuring machine (CMM) 30. The CMM 30 has a table 32 on which the workpiece can be mounted. A Z column is moveable in X, Y and Z relative to the table 32, this motion being enabled by a series of carriages 36, 38, 34 able to move in X, Y and Z respectively, each of the carriages being provided with bearing arrangements, motors and transducers (not shown).

An articulating probe head 40 is mounted on the Z column 34 of the CMM, which provides rotational motion of a surface sensing device such as a measurement probe mounted on it. The articulating probe head is described in more detail with reference to FIG. 5.

Figure 5:
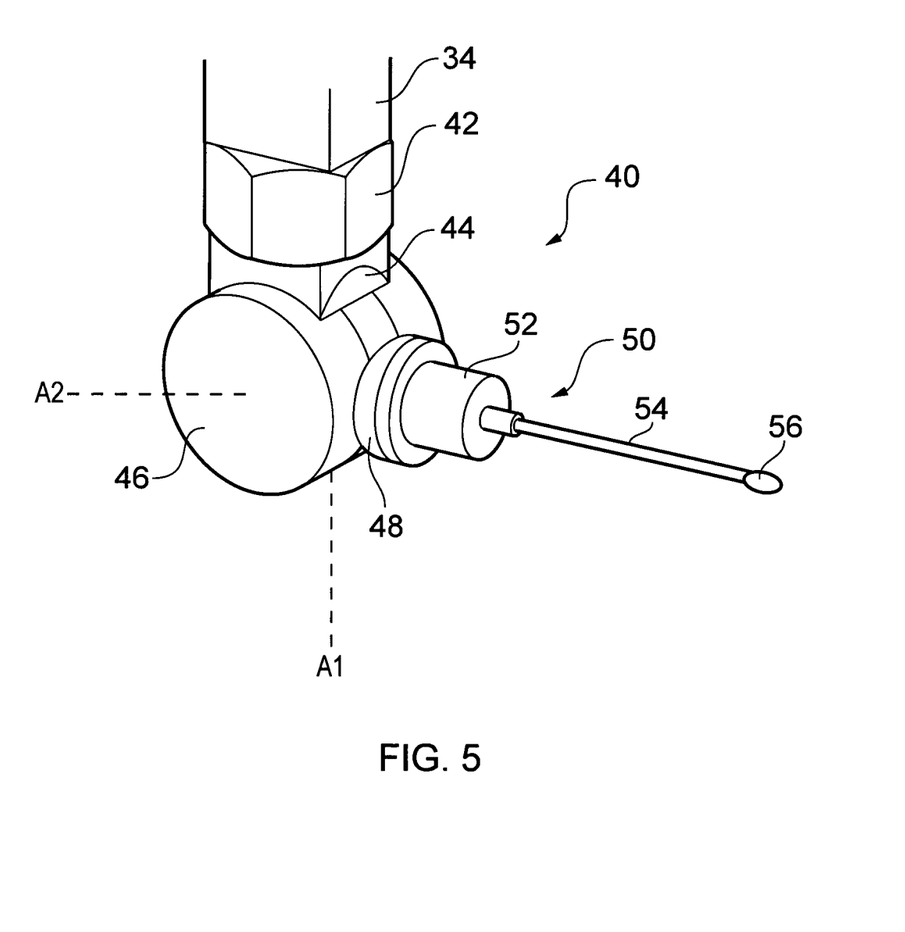
FIG. 5 is a perspective view of an articulating probe head and measurement probe.

As illustrated in FIG. 5, the articulating scanning head 40 comprises a fixed part formed by a first housing 42 mounted onto the Z column 34. The first housing 42 supports a movable part 46 which is rotatable by a motor (not shown) relative to the first housing 42 about an axis A1. The movable part 44 is secured to a second housing 46 which in turn supports a shaft 48 rotatable by a motor (not shown) relative to the housing 46 about an axis A2, substantially perpendicular to the axis A1.

A surface sensing device, in this example a contact measurement probe 50, is mounted on the shaft 48 of the articulating probe head. The contact measurement probe 50 is provided with a probe housing 52 and deflectable stylus 54 having a workpiece contacting tip 56.

The arrangement described above is such that the motors of the articulating probe head can position the workpiece contacting tip 56 of the measurement probe 50 angularly about the axes A1 or A2 and the motors of the CMM (not shown) can position the articulating probe head linearly anywhere within the three-dimensional coordinate framework of the CMM to bring the stylus tip into a predetermined relationship with the surface being scanned.

Linear position transducers (not shown) are provided on the CMM for measuring linear displacement of the articulating probe head and angular position transducers are provided in the articulating probe head (not shown) for measuring angular displacement of the stylus about the respective axes A1 and A2. The measurement probe is also provided with transducers to determine deflection of the stylus.

The motion of the CMM and the articulating probe head is controlled by a controller, which may comprise a bespoke controller or a personal computer (PC) 58. The controller sends a drive command to the CMM and articulating probe head to drive their respective motors and thereby position the measurement probe.

The controller receives feedback from transducers in the CMM, articulating probe head and measurement probe which enable it to determine the position of the probe tip.

The articulating probe head may be mounted on other types of coordinate positioning apparatus, such as on the spindle of a machine tool, a manual CMM; robotic arm or articulating arm. The coordinate measuring machine is not limited to being a Cartesian type machine, as described in FIG. 4, it may also be a non-cartesian type, as described in international patent application WO 95/20747.

The conical surface of the valve seat is measured using the technique for measuring bores as disclosed in WO90/07097 but by adapting the scan to take into account for the non uniform radius (i.e. a conical rather than a cylindrical surface).

Figure 6:
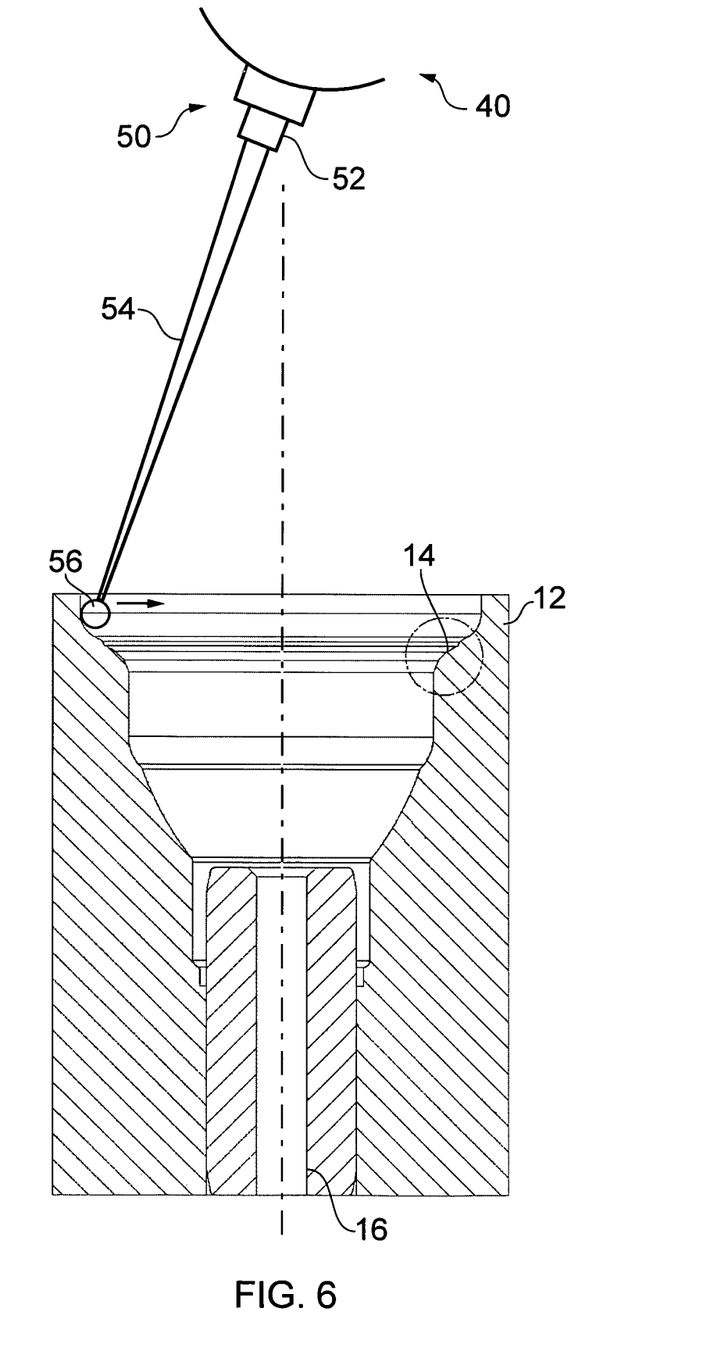
FIG. 6 is a schematic illustration of a valve seat being measured by a measurement probe mounted on an articulating probe head.

FIG. 6 illustrates a side view of a vertical valve seat being scanned by the apparatus illustrated in FIGS. 4 and 5.

In a first step the centre line of the valve seat and maximum radius is determined, e.g. from CAD data or direct measurement. The regions of the valve seat just above and below the valve seat are also measured, so this must be taken into account in choosing the maximum radius.

The centre of rotation of the articulating probe head (i.e. the intersection of the A1 and A2 axes) is aligned with the centre line of the valve seat. The A2 head angle of the articulating probe head (i.e. position of shaft 48 about axis A2) is adjusted so that the workpiece contacting tip 56 of the measurement probe 50 contacts the inner surface of the valve seat, just above the conical surface. The A1 head angle of the articulating head (i.e. the position of member 44 about axis A1) can be adjusted to move the workpiece contacting tip 56 in a circular path about the centre line of the valve seat.

A spiral scan of the region of the valve seat including the conical surface is performed by moving the articulating probe head along the centre line whilst moving the workpiece contacting tip in a circular path about the A1 axis. Use of the spiral profile has the advantage of performing the measurement in a single scan and this profile also benefits from the higher dynamic response of the articulating probe head than the CMM.

This motion of the CMM and articulating head creates a spiral scan path along a cylindrical surface. However, the scan is adapted during its course to accommodate the actual shape of the region being measured (i.e. a conical surface):

The measurement probe is kept within a defined measurement range, such as a defined stylus deflection range (e.g. between 40-50 microns). If the deflection is outside the range, the head angles of the articulating probe head are adjusted to return the deflection to within its range. In this way, the scan is adapted to the surface shape.

In the example shown in FIG. 6, the A2 head angle is adjust to reduce the radius of the circular scan, thereby maintaining the probe within its defined stylus deflection range.

For horizontal valve seats or other orientations, a combination of the A1 and A2 axes are adjusted to keep the measurement probe within its measurement range.

This method of adaptive scanning has the benefit that a simple scan profile can be programmed (i.e. a cylindrical surface) and adapted during the scan to suit a more complex shape, thus giving ease of programming.

Although the above example describes a helical scan, the scan may also comprise a series of circle scans, in which the articulating probe head is moved along the centre line in a step-wise manner.

This technique of adaptive scanning is suitable for other surface features, for example nose cones.

The benefit of using the measuring system described above is that it enables a high point density of the measurement data to be produced quickly due to the high sampling rate of the articulating probe head. Conventional measuring techniques may also be used to collect the measurement data but the time needed to take the required amount of data means that these methods aren't practical.

For example, 12 valve seats and 36 valve guides can be measured by the above described method in under four minutes, whereas conventional techniques would take almost half an hour.

The use of a contact measurement probe has the advantage of good accuracy of data points with fine detail over the measured area but non contact measurement probes may also be used, for example optical, capacitance or inductance probes.

Figure 7:
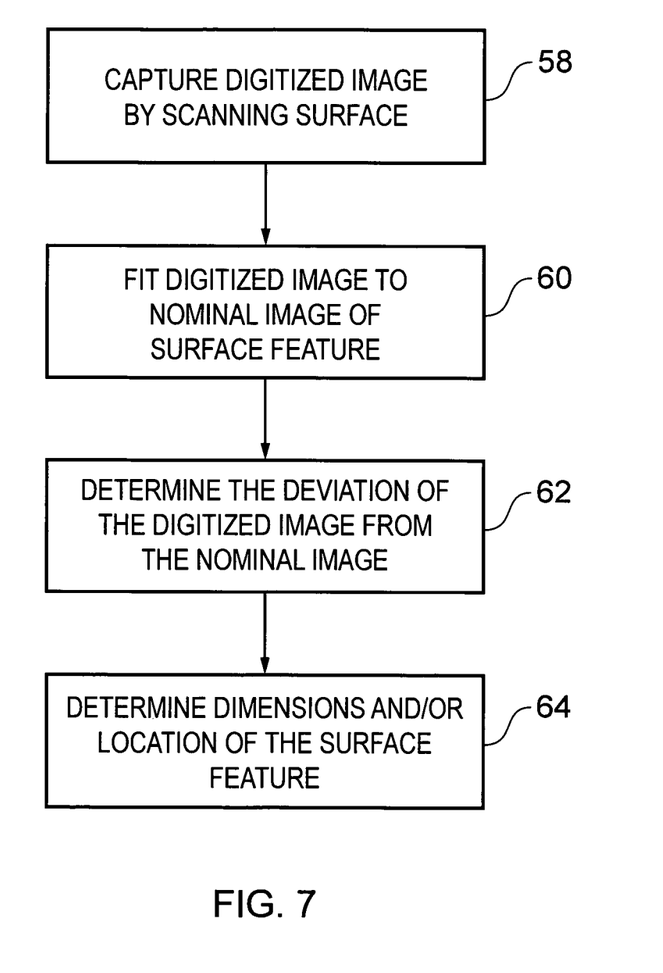
FIG. 7 is a flow diagram illustrating the steps of determining dimensions and location of a surface feature.

Once the measurement data of the valve seat has been collected, it may be used to determine the location and/or dimensions of the valve seat, as described with reference to FIG. 7.

In a first step, a digitized image is captured by measuring the surface and thereby gathering multiple data points 58.

The method of collecting the measurement data described enable a digitized image with a high point density of the measured surface to be created. The surface is now represented by a discrete set of points.

The digitized data is now fitted to a shape having the desired form and dimensions 60. For the valve seat example, the digitized data is best fitted using least squares to a cone having the desired dimensions of the conical surface. The desired dimensions of the conical surface may be known from the design data (e.g. CAD data). Other best fitting techniques may also be used, for example Chebychev.

The valve seat is made of multiple cones and each cone of interest is fitted separately.

The digitized data contains data from above and below the valve seat and the excess data must be trimmed either before the fitting or part of the fitting process.

Figure 8:
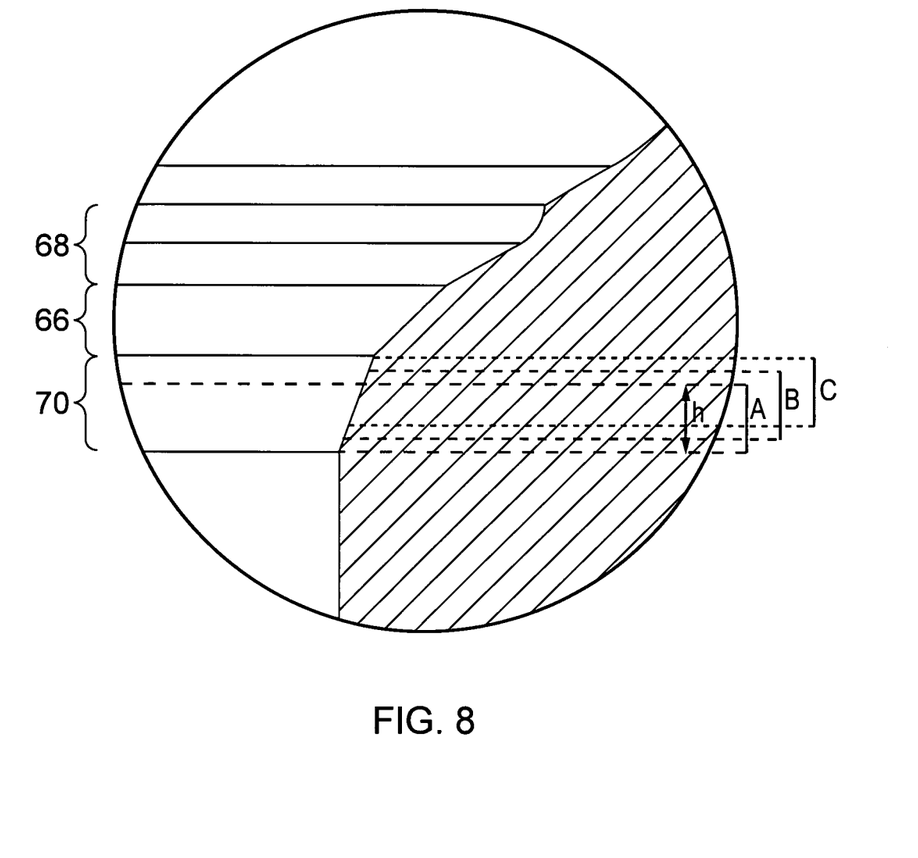
FIG. 8 is a schematic illustration of the digitized data of the valve seat.

One method of trimming the data is described with reference to FIG. 8. FIG. 8 illustrates the data cloud relating to the digitized image of the scanned area. The data in region 66 is measurement data relating to the conical surface of the valve seat, whereas the data in regions 68 and 70 are measurement data relating to regions above and below the valve seat, respectively.

A band of data A is selected, the band comprising a section of the data cloud transverse to the centre line 72. The height h of the band is chosen to be slightly less than the height of the conical surface of the valve seat. This band of data A is fitted to the cone as described above. This method is repeated by moving the band of data A up along the centre line 72, so that different overlapping bands of data are fitted with the cone. FIG. 8 shows band B and C of data which have been moved up the centre line. When the band of data corresponds to the conical surface of valve seat (i.e. and not the areas above and below) a best fit will be produced.

Once the digitized image has been fitted to the nominal image of the surface feature, the deviation of the digitized image from the nominal image can be determined 64. This data will give the lateral position and angle of the conical surface of the valve seat in the valve body.

A comparison of the conical surface of the valve seat with the nominal data can be used to determine whether the valve seat is within tolerance. Unlike conventional methods of measuring valve seats, data is available for all of the valve seat and not just regions of it.

Figure 9:
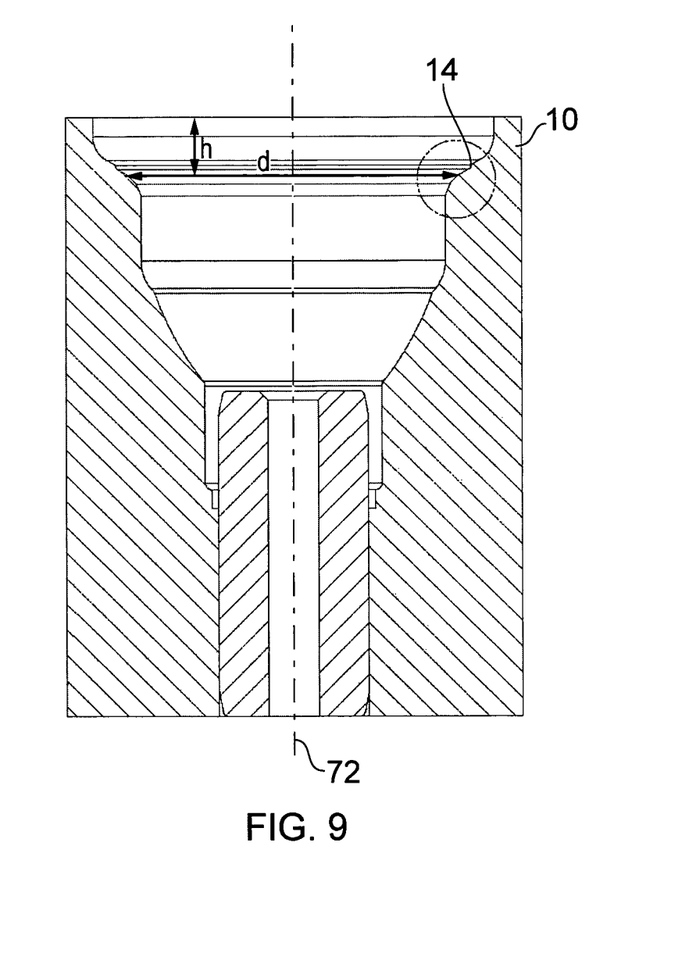
FIG. 9 is a cross sectional side view of the conical surface of the valve seat.

FIG. 9 illustrates a method of determining whether the valve seat is at the correct height in the valve body. The value of the diameter d is determined, using the best fitted data, at a known height h from a fixed surface in the valve body. This value of the diameter d is compared with the nominal diameter at that height and determined whether the diameter is within tolerance. This can be repeated for different values of h. This may be done vice versa by selecting a height to match a known diameter.

Although the above embodiments describe the measurement of a valve seat, the method of using digitised data to describe a surface feature and fitting it to a nominal feature is suitable for other surface features. It is a particularly useful method for measuring face seals amongst other applications. It is not necessary for the surface feature to have symmetry about a centre line as described but this does ease speed of scanning.

Although the use of an articulating scanning head on a coordinate measuring machine is described for gathering the measurement data, other techniques may be used but the above described technique has the advantage of speed and accuracy.

This method has the advantage that data is collected for the full area of interest, as opposed to the prior art, where discrete measurements were obtained over linear or circular paths in the area of interest.

The invention claimed is:

1. A method of determining the dimensions and location of a surface feature, the method comprising the steps of:
    (a) creating a digitized image of a surface feature from multiple data points acquired from surface measurement of the feature;
    (b) fitting the digitized image to a nominal image of the surface feature, different sections of the digitized image being fitted to the nominal image separately; and
    (c) determining the deviation of the digitized image from the nominal image to thereby determine at least one of the dimensions, location and form deviation of the surface feature,
    wherein the nominal image is acquired from a source other than the surface measurement of the feature.

2. A method according to claim 1 wherein the multiple data points acquired from surface measurement of the feature are collected by using a surface sensing device mounted on a coordinate positioning apparatus.

3. A method according to claim 2 wherein the surface sensing device comprises a measurement probe.

4. A method according to claim 2 wherein the surface sensing device is mounted on an articulating probe head which enables rotation of a measurement probe about two or more axes.

5. A method according to claim 3 wherein the surface sensing device is a contact probe.

6. A method according to claim 1 wherein the step of fitting the digitized image to a nominal image in step (b) is carried out by a best fit method.

7. A method according to claim 1 wherein the multiple data points relate to a surface area greater than the surface area of the surface feature.

8. A method according to claim 1 wherein the deviation of the digitized image from the nominal image determined in step (c) is used to determine at least one of lateral position of the surface feature within a part, height of the surface feature within a part and angle of the surface feature within a part.

9. A method according to claim 1 wherein the multiple data points are acquired from tactile surface measurement of the feature.

10. A method according to claim 1 wherein the surface measurements are collected from a spiral measurement profile.

11. A program embodied on a non-transitory, computer readable medium for determining the dimensions and location of a surface feature, the program comprising code adapted to perform the steps in claim 1.

12. A method of determining the dimensions and location of a valve seat, the method comprising the steps of:
    (a) measuring the surface of the valve seat along a spiral path;
    (b) creating a digitized image of the surface of the valve seat from multiple data points acquired from surface measurement of the valve seat; and
    (c) fitting the digitized image to a nominal image of the surface of the valve seat, different sections of the digitized image being fitted to the nominal image separately,
    wherein the nominal image is acquired from a source other than the surface measurement of the valve seat.

13. A method according to claim 12 wherein the measurement in step (a) is tactile measurement.

14. A method according to claim 12 including the additional step of determining the deviation of the digitized image from the nominal image.

15. A method according to claim 14 including the step of using the deviation to determine at least one of the dimensions, location and form deviation of the surface of the valve seat.

16. A method according to claim 1, wherein the nominal image comprises a CAD image.

17. A method according to claim 1, wherein the nominal image of the surface feature comprises a shape having the desired form and dimensions of the surface feature.

18. A method according to claim 1, further comprising the step of selecting the different sections of the digitized image from the digitized image.

19. A method according to claim 1, wherein the different sections of the digitized image are fitted to a part of the nominal image.

20. A method of determining the dimensions and location of a surface feature, the method comprising the steps of:
    (a) creating a digitized image of a surface feature from multiple data points acquired from surface measurement of the feature;
    (b) fitting the digitized image to a nominal image of the surface feature, different sections of the digitized image being fitted to the nominal image separately; and
    (c) determining the deviation of the digitized image from the nominal image to thereby determine at least one of the dimensions, location and form deviation of the surface feature, wherein the nominal image is not acquired from the surface measurement of the feature.

21. A method of determining the dimensions and location of a valve seat, the method comprising the steps of:
    (a) measuring the surface of the valve seat along a spiral path;
    (b) creating a digitized image of the surface of the valve seat from multiple data points acquired from surface measurement of the valve seat; and
    (c) fitting the digitized image to a nominal image of the surface of the valve seat, different sections of the digitized image being fitted to the nominal image separately,
    wherein the nominal image is not acquired from the surface measurement of the valve seat.

* * * * *